United States Patent
Sun et al.

(10) Patent No.: US 9,137,717 B2
(45) Date of Patent: Sep. 15, 2015

(54) METHOD AND APPARATUS FOR MANAGING MOBILITY EVENTS IN A DUAL-FREQUENCY DUAL-CELL WIRELESS COMMUNICATION NETWORK

(75) Inventors: Haitong Sun, San Diego, CA (US); Beibei Wang, Bridgewater, NJ (US); Sharad Deepak Sambhwani, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 13/561,317

(22) Filed: Jul. 30, 2012

(65) Prior Publication Data

US 2013/0182657 A1    Jul. 18, 2013

Related U.S. Application Data

(60) Provisional application No. 61/586,676, filed on Jan. 13, 2012.

(51) Int. Cl.
*H04W 72/04* (2009.01)
*H04W 36/00* (2009.01)

(52) U.S. Cl.
CPC ...... *H04W 36/0083* (2013.01); *H04W 72/0453* (2013.01)

(58) Field of Classification Search
None
See application file for complete search history.

(56) References Cited

U.S. PATENT DOCUMENTS

| 6,845,238 | B1* | 1/2005 | Muller ............... 455/436 |
| 2011/0034175 | A1 | 2/2011 | Fong et al. |
| 2011/0228756 | A1 | 9/2011 | Kim et al. |
| 2012/0002637 | A1 | 1/2012 | Adjakple et al. |
| 2012/0014267 | A1 | 1/2012 | Gomes et al. |
| 2013/0058233 | A1* | 3/2013 | Kim ................... 370/252 |
| 2013/0196671 | A1* | 8/2013 | Kubota et al. ......... 455/442 |
| 2014/0045487 | A1* | 2/2014 | Mustapha ........... 455/422.1 |

FOREIGN PATENT DOCUMENTS

WO    2011121175 A1    10/2011

OTHER PUBLICATIONS

Alcatel-Lucent: "DC-HSUPA Dynamic Activation of 2nd Carrier from NB with Independent Active Sets", 3GPP Draft: R2-094233, 3rd Generation Partnership Project (3GPP), pp. 1-3.*
Aggregation-definition of aggregation by The Free Dictionary, accessed Dec. 23, 2014, http://www.thefreedictoinary.com/aggregation, pp. 1-4.*
3GPP TS 25.331 v11.0.0 (Dec. 2011), 3rd Generation Partnership Project; Technical Specification Group Radio Access Network; Radio Resource Control (RRC); Protocol specification (Release 11).

(Continued)

*Primary Examiner* — Omar Ghowrwal
(74) *Attorney, Agent, or Firm* — Darren M. Simon

(57) ABSTRACT

A method operable at a user equipment configured for wireless communication over a dual-frequency, dual-cell network is disclosed includes a primary carrier and a secondary carrier. The method includes maintaining an active set corresponding to the primary carrier; maintaining a virtual active set corresponding to the secondary carrier; and transmitting a control signal including a virtual mobility event corresponding to a change in the virtual active set. An apparatus for performing the method is also disclosed.

13 Claims, 12 Drawing Sheets

(56) References Cited

OTHER PUBLICATIONS

Alcatel-Lucent: "DC-HSUPA Dynamic Activation of 2nd Carrier from NB with Independent Active Sets", 3GPP Draft; R2-094233, 3rd Generation Partnership Project (3GPP), Mobile Competence Centre; 650, Route Des Lucioles; F-06921 Sophia-Antipolis Cedex; France, no. Shenzhen. China; 20090817, Aug. 17, 2009, XP050352496.

Alcatel-Lucent et al: "Further Discussion on Fast Primary Carrier Change in 4C-HSDPA", 3GPP Draft; R1-104071, 3rd Generation Partnership Project (3GPP), Mobile Competence Centre; 650, Route Des Lucioles; F-06921 Sophia-Antipolis Cedex; France, vol. RAN WG1, no. Dresden, Germany; 20100628, Jun. 24, 2010, XP050449519.

International Search Report and Written Opinion—PCT/US2013/021175—ISA/EPO—May 31, 2013.

Nokia Corporation et al., "Discussion on secondary carrier intrafrequency measurement procedure", 3GPP Draft; R2-095654, 3rd Generation Partnership Project (3GPP), Mobile Competence Centre; 650, Route Des Lucioles; F-06921 Sophia-Antipolis Cedex; France, no. Miyazaki; 20091012, Oct. 12, 2009, XP050390167.

* cited by examiner ial application No. 61/586,676, entitled "METHOD AND
METHOD AND APPARATUS FOR MANAGING MOBILITY EVENTS IN A DUAL-FREQUENCY DUAL-CELL WIRELESS COMMUNICATION NETWORK

CLAIM OF PRIORITY UNDER 35 U.S.C. §119

The present application for patent claims priority to provisional application No. 61/586,676, entitled "METHOD AND APPARATUS FOR MANAGING MOBILITY EVENTS IN A DUAL-FREQUENCY DUAL-CELL WIRELESS COMMUNICATION NETWORK" filed Jan. 13, 2012, which is assigned to the assignee hereof and hereby expressly incorporated by reference herein.

BACKGROUND

1. Field

Aspects of the disclosed approach relate generally to wireless communication systems, and more particularly, to a method and apparatus for managing mobility events in a dual-frequency dual-cell wireless communication network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of a method and apparatus for managing mobility events in a dual-frequency dual-cell wireless communication network in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method operable at a user equipment configured for wireless communication over a dual-frequency, dual-cell network includes a primary carrier and a secondary carrier. The method includes maintaining an active set corresponding to the primary carrier; maintaining a virtual active set corresponding to the secondary carrier; and transmitting a control signal including a virtual mobility event corresponding to a change in the virtual active set.

Further, according to various aspects, the subject innovation relates to apparatus and methods that provide wireless communications, where a method operable at a network node in a dual-frequency, dual-cell network includes a first carrier and a second carrier. The method includes receiving a first measurement report from a user equipment corresponding to an active set; receiving a second measurement report from the user equipment corresponding to a virtual active set; and establishing one of the first carrier or the second carrier as an anchor carrier for the user equipment in accordance with a determination as to which of the first or second carriers results in a lesser uplink imbalance.

Further still, according to various aspects, the subject innovation relates to apparatus and methods that provide wireless communications, where an apparatus is configured for wireless communication over a dual-frequency, dual-cell network including a primary carrier and a secondary carrier. The apparatus includes means for maintaining an active set corresponding to the primary carrier; means for maintaining a virtual active set corresponding to the secondary carrier; and means for transmitting a control signal having a virtual mobility event corresponding to a change in the virtual active set.

Further still, according to various aspects, the subject innovation relates to apparatus and methods that provide wireless communications, where an apparatus is configured to operate in a dual-frequency, dual-cell network including a first carrier and a second carrier. The apparatus includes means for receiving a first measurement report from a user equipment corresponding to an active set; means for receiving a second measurement report from the user equipment corresponding to a virtual active set; and means for establishing one of the first carrier or the second carrier as an anchor carrier for the user equipment in accordance with a determination as to which of the first or second carriers results in a lesser uplink imbalance.

Further still, according to various aspects, the subject innovation relates to apparatus and methods that provide wireless communications, where an apparatus is configured for wireless communication over a dual-frequency, dual-cell network including a primary carrier and a secondary carrier. The apparatus includes a processor configured to maintain an active set corresponding to the primary carrier; maintain a virtual active set corresponding to the secondary carrier; and transmit a control signal having a virtual mobility event corresponding to a change in the virtual active set; and a memory coupled to the processor.

Further still, according to various aspects, the subject innovation relates to apparatus and methods that provide wireless communications, where an apparatus is configured to operate in a dual-frequency, dual-cell network including a first carrier and a second carrier. The apparatus includes a processor configured to receive a first measurement report from a user equipment corresponding to an active set; receive a second measurement report from the user equipment corresponding to a virtual active set; and establish one of the first carrier or the second carrier as an anchor carrier for the user equipment in accordance with a determination as to which of the first or second carriers results in a lesser uplink imbalance; and a memory coupled to the processor.

Further still, according to various aspects, the subject innovation relates to a computer program product includes a machine-readable storage medium having code for maintaining an active set corresponding to a primary carrier in a dual-frequency, dual-cell network; code for maintaining a virtual active set corresponding to a secondary carrier in the dual-frequency, dual-cell network; and code for transmitting a control signal having a virtual mobility event corresponding to a change in the virtual active set.

Further still, according to various aspects, the subject innovation relates to a computer program product including a machine-readable storage medium having code for receiving a first measurement report from a user equipment corresponding to an active set; code for receiving a second measurement report from the user equipment corresponding to a virtual active set; and code for establishing one of a first carrier or a second carrier in a dual-frequency, dual-cell network as an anchor carrier for the user equipment in accordance with a determination as to which of the first or second carriers results in a lesser uplink imbalance.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
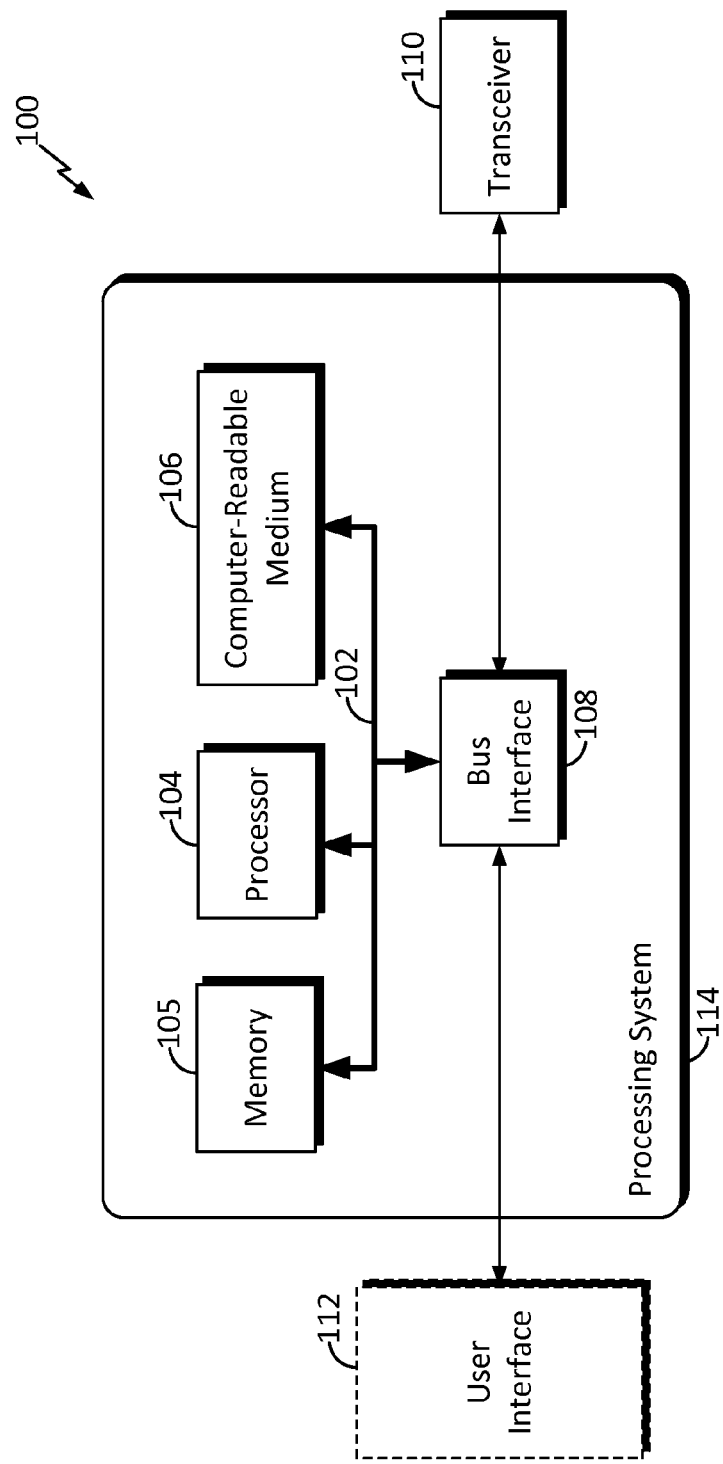
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards. In any wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 310 and the core network 304 (referring to FIG. 3), and may include circuit switched and packet switched protocols. The AS provides the lower layers, for signaling between the UTRAN 302 and the UE 310, and may include a user plane and a control plane. Here, the user plane or data plane carries user traffic, while the control plane carries control information (i.e., signaling).

Figure 2:
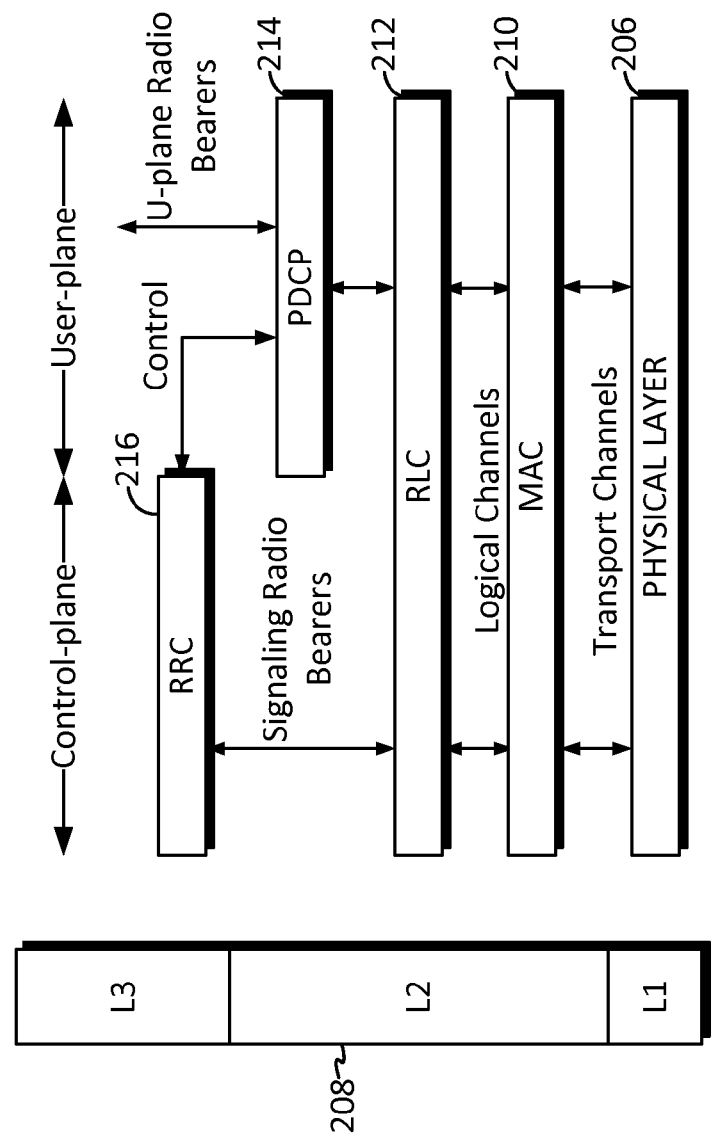
FIG. 2 is a conceptual diagram illustrating an example of a radio protocol architecture for the user and control plane.

Turning to FIG. 2, the AS is shown with three layers: Layer 1, Layer 2, and Layer 3. Layer 1 is the lowest layer and implements various physical layer signal processing functions. Layer 1 will be referred to herein as the physical layer 206. The data link layer, called Layer 2 208, is above the physical layer 206 and is responsible for the link between the UE 310 and Node B 308 over the physical layer 206.

At Layer 3, the RRC layer 216 handles the control plane signaling between the UE 310 and the Node B 308. RRC layer 216 includes a number of functional entities for routing higher layer messages, handling broadcasting and paging functions, establishing and configuring radio bearers, etc.

In the illustrated air interface, the L2 layer 208 is split into sublayers. In the control plane, the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the disclosed approach, the term "packet" may refer to any RLC PDU exchanged between RLC peer entities.

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Figure 3:
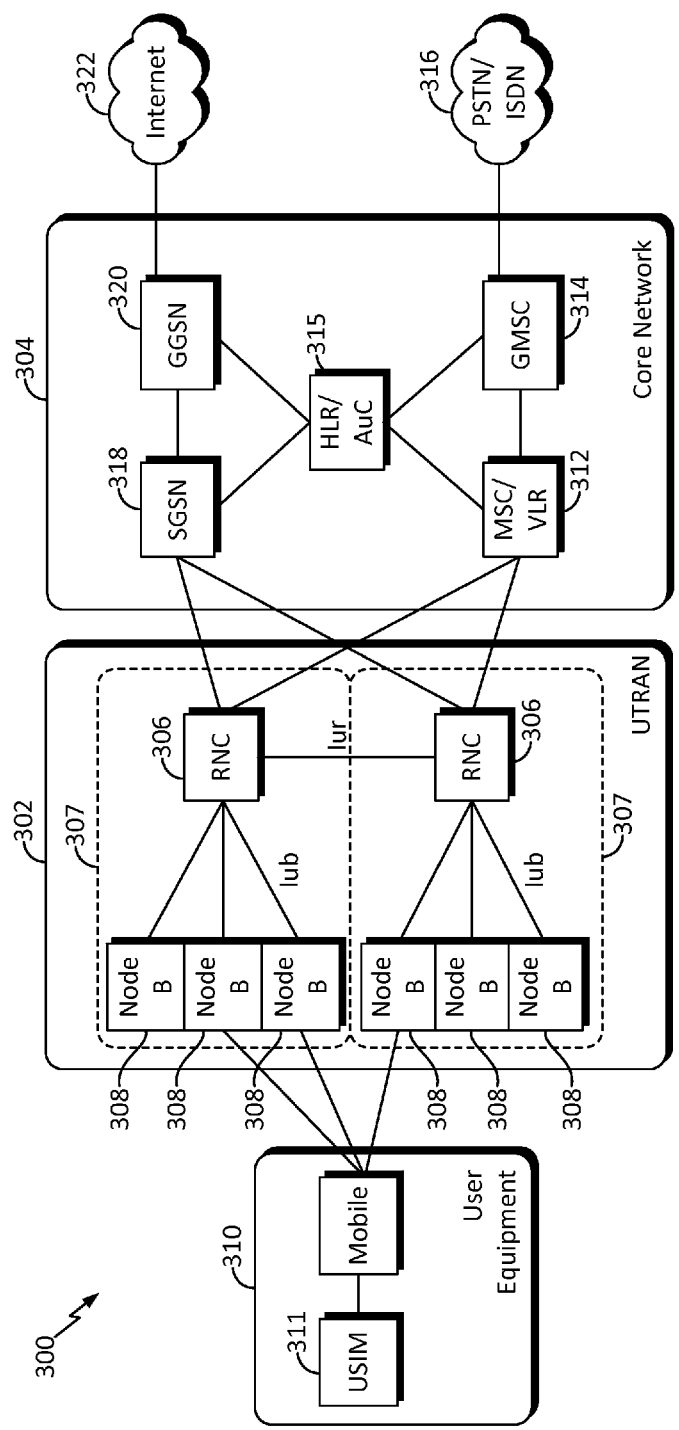
FIG. 3 is a block diagram conceptually illustrating an example of a telecommunications system.

Referring now to FIG. 3, as an illustrative example without limitation, various aspects of the disclosed approach are illustrated with reference to a Universal Mobile Telecommunications System (UMTS) system 300. A UMTS network includes three interacting domains: a core network 304, a radio access network (RAN) (e.g., the UMTS Terrestrial Radio Access Network (UTRAN) 302), and a user equipment (UE) 310. Among several options available for a UTRAN 302, in this example, the illustrated UTRAN 302 may employ a W-CDMA air interface for enabling various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring, and releasing radio resources within the RNS 307. The RNC 306 may be interconnected to other RNCs (not shown) in the UTRAN 302 through various types of interfaces such as a direct physical connection, a virtual network, or the like using any suitable transport network.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 302 is based on such DS-CDMA technology and additionally calls for a frequency division duplexing (FDD). FDD uses a different carrier frequency for the uplink (UL) and downlink (DL) between a Node B 408 and a UE 310. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

The geographic region covered by the RNS 307 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a core network 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. The downlink (DL), also called the forward link, refers to the communication link from a Node B 308 to a UE 310 and the uplink (UL), also called the reverse link, refers to the communication link from a UE 310 to a Node B 308.

The core network 304 can interface with one or more access networks, such as the UTRAN 302. As shown, the core network 304 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The illustrated core network 304 also supports packet-switched data services with a serving GPRS support node (SGSN) 318 and a gateway GPRS support node (GGSN) 320. General Packet Radio Service (GPRS) is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

Figure 4:
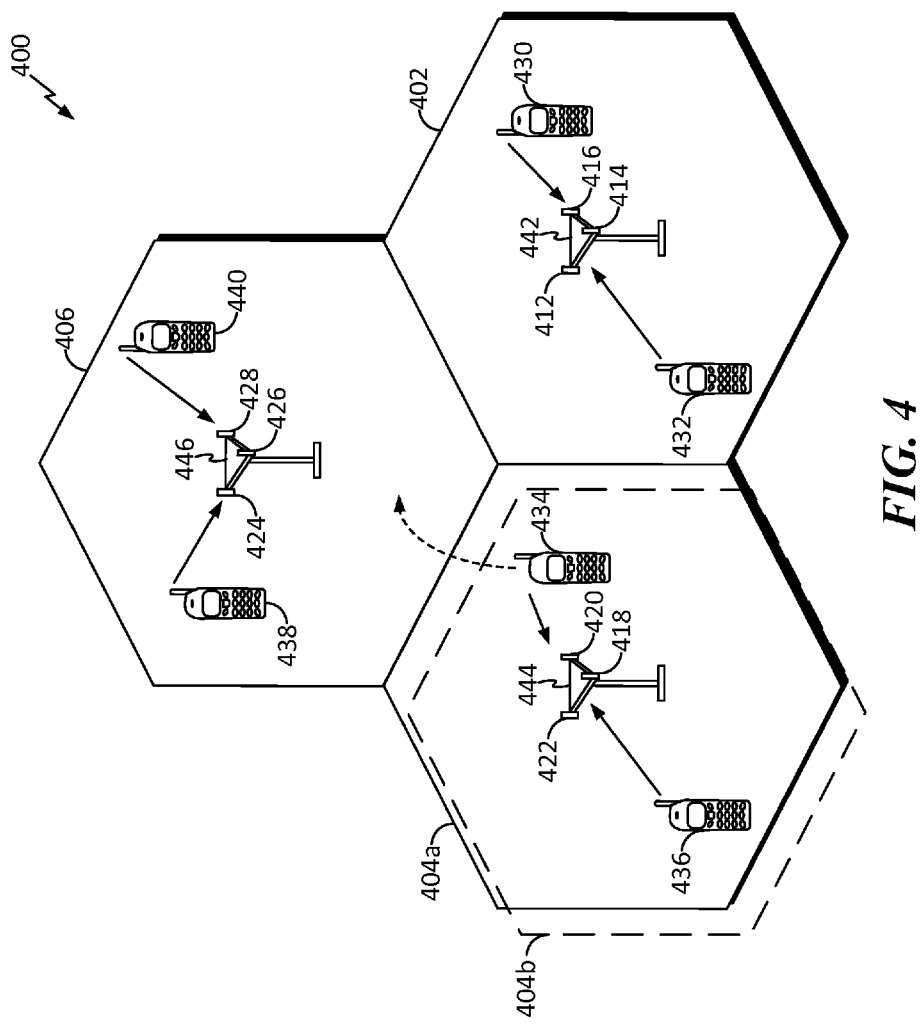
FIG. 4 is a conceptual diagram illustrating an example of an access network.

The UTRAN 302 is one example of a RAN that may be utilized in accordance with the disclosed approach. Referring to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with Node B 442, UEs 434 and 436 may be in communication with Node B 444, and UEs 438 and 440 may be in communication with Node B 446. Here, each Node B 442, 444, and 446 may be configured to provide an access point to a core network 304 (see FIG. 3) for all the UEs 430, 432, 434, 436, 438, and 440 in the respective cells 402, 404, and 406.

During a call with the source cell 404a, or at any other time, the UE 436 may monitor various parameters of the source cell 404a as well as various parameters of neighboring cells such as cells 404b, 406, and 402. Further, depending on the quality of these parameters, the UE 436 may maintain some level of communication with one or more of the neighboring cells. During this time, the UE 436 may maintain an Active Set, that is, a list of cells that the UE 436 is simultaneously connected to (i.e., the UTRA cells that are currently assigning a downlink dedicated physical channel DPCH or fractional downlink dedicated physical channel F-DPCH to the UE 436 may constitute the Active Set). Here, the cells in the Active Set can form a soft handover connection to the UE. The UE may additionally include a neighbor set or monitored set, including a list of cells that the UE may measure, but whose signal strength is not high enough to be included in the Active Set.

Management of the Active Set can be enabled through the use of certain Radio Resource Control (RRC) messages between the RNC and UE. For example, the selection of cells to include in the Active Set may depend on certain UE measurements, which may be configured by the network in a system information block (SIB).

For example, the UE may measure a ratio between the signal strength and the noise floor ($E_c/I_0$) of a pilot signal (e.g., a common pilot channel CPICH) transmitted by each cell in the UE's monitored set. That is, the UE may determine the $E_c/I_0$ for nearby cells, and may rank the cells based on these measurements.

When the ranking of a cell changes, or if any other reporting trigger or measurement event (discussed in further detail below) occurs, the UE may send certain RRC messages to the RNC to report this event. Thus, the RNC may make a decision to alter the Active Set for the UE, and send an RRC message (i.e., an Active Set Update message) to the UE indicating a change in the Active Set. The RNC may then communicate with the respective Node B or Node Bs, e.g., over an Iub interface utilizing Node B Application Part (NBAP) signaling to configure the cells for communication with the UE. Finally, the RNC may communicate with the UE utilizing further RRC messages, such as a Physical Channel Reconfiguration (PCR) message, with an RRC response from the UE of PCR Complete indicating success of the reconfiguration.

Figure 5:
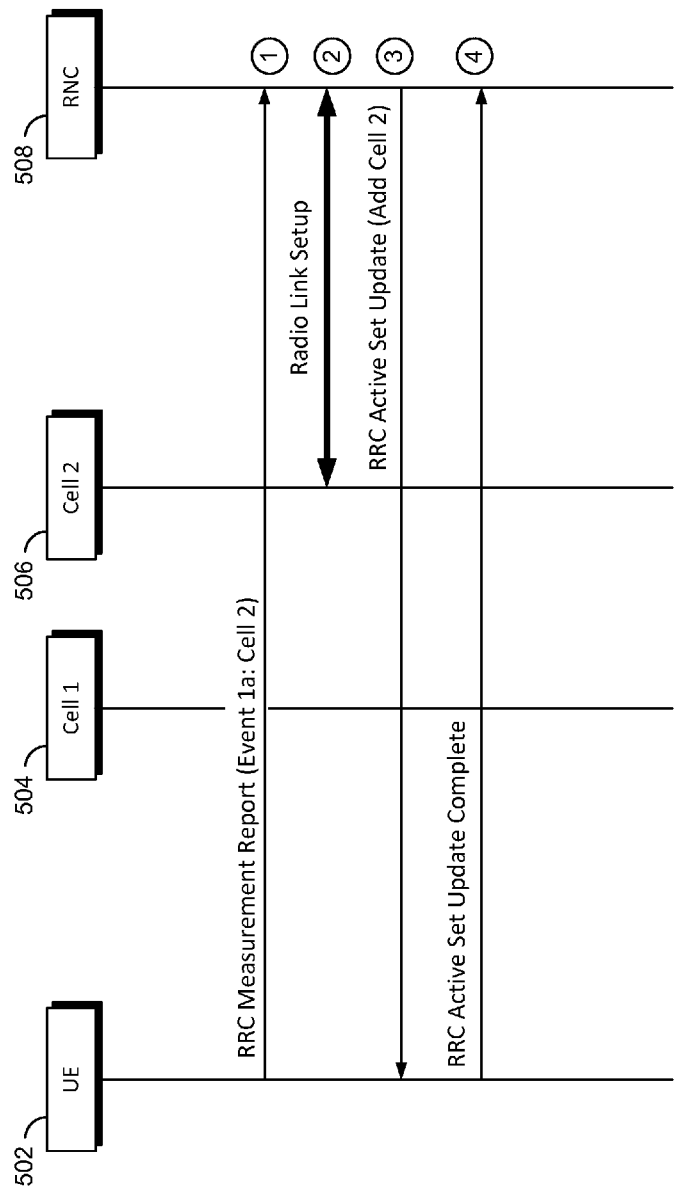
FIG. 5 is a call flow diagram illustrating an Event 1a mobility event.

One reporting trigger may result when a primary CPICH enters the reporting range for the UE. That is, when the $E_c/I_0$ for a particular cell reaches a particular threshold (e.g., a certain number of dB below the $E_c/I_0$ of the primary serving cell) and maintains that level for a certain time such that it may be appropriate to add the cell to the Active Set a reporting event called Event 1A may occur. FIG. 5 is a simplified call flow diagram illustrating some of the signaling among nodes for Event 1A. In this and the call flow diagrams to follow, time generally proceeds from the top of the diagram to the bottom, although in many cases the illustrated sequence of signals is not intended to be the only possible sequence, and other sequences may be utilized in accordance with various aspects of the disclosed approach. Further, the sequence numbers at the right-hand side of the call flow diagrams is merely placed to ease a description, and each time number may represent any reasonable span of time from an instant to several seconds.

In the illustrated example, at time (1), a UE 502 has determined that a measurement of Cell 2 has increased above a threshold and entered a reporting range, and thus, the UE 502 may transmit an RRC Measurement Report message including Event 1A and identifying Cell 2, 506. In response, at time (2), the RNC 508 may communicate with Cell 2, 506, over the Iub interface utilizing NBAP signaling to set up a radio link with the UE 502. At time (3), the RNC 508 may send an RRC Active Set Update message to the UE 502 indicating to add Cell 2, 506, to its Active Set. The UE 502 may respond at time (4), with an RRC Active Set Update Complete message to the RNC 508, completing the Active Set update.

Figure 6:
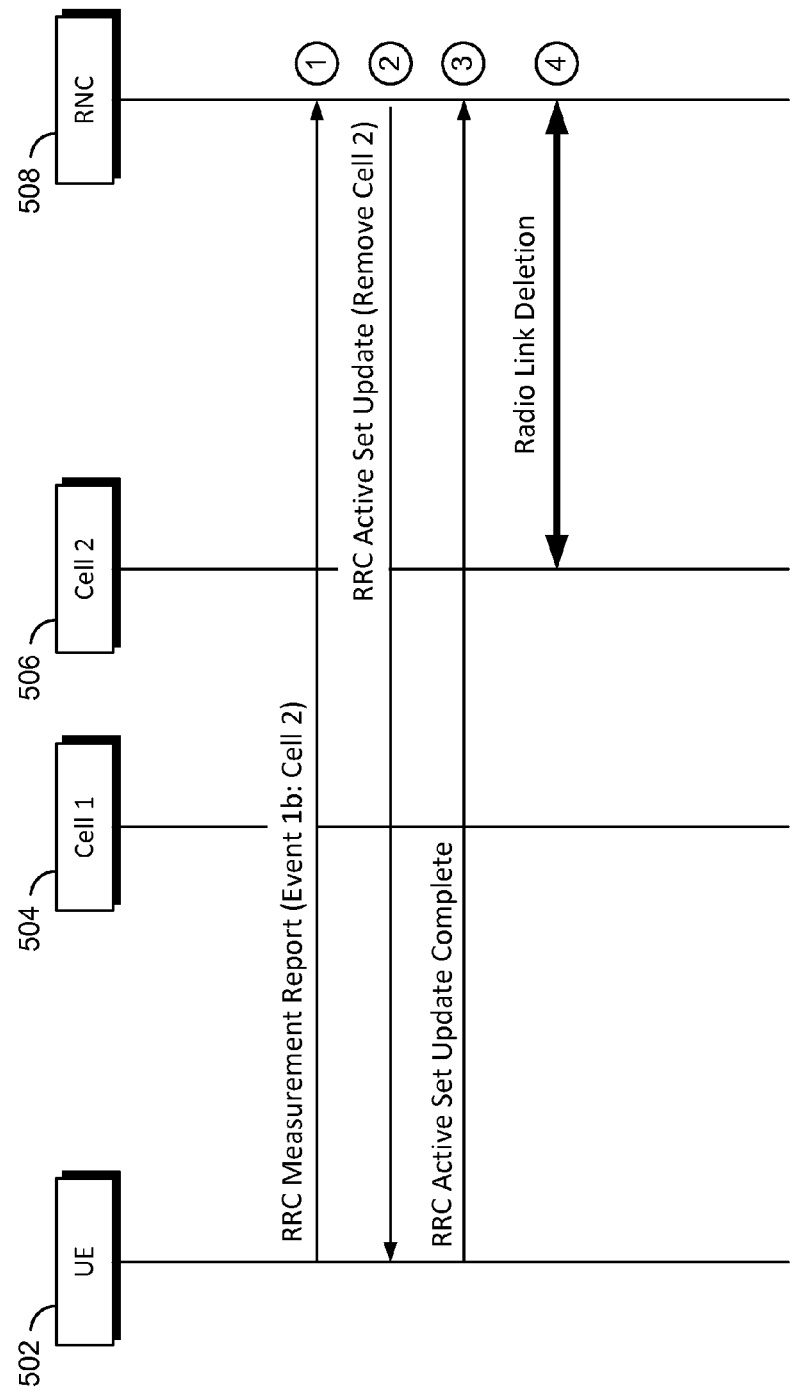
FIG. 6 is a call flow diagram illustrating an Event 1b mobility event.

Another reporting trigger may result when a primary CPICH leaves the reporting range. That is, when the $E_c/I_0$ for a particular cell falls below a particular threshold (e.g., a certain number of dB below the $E_c/I_0$ of the primary serving cell), and maintains that level for a certain time such that it may be appropriate to remove the cell from the Active Set a reporting event called Event 1B may occur. FIG. 6 is a simplified call flow diagram illustrating some of the signaling among nodes for Event 1B. In the illustrated example, at time (1), the UE 502 has determined that Cell 2, 506 has left the reporting range. Thus, the UE 502 may transmit the RRC Measurement Report message including Event 1B and identifying Cell 2 506. In response, at time (2), the RNC 508 may transmit an RRC Active Set Update message to the UE 502 indicating to remove Cell 2 506 from the Active Set. At time (3), the UE 502 may then respond with an RRC Active Set Update Complete message to the RNC 508, indicating that the Active Set is updated. At time (4), the RNC 508 may then transmit NBAP signaling over the Iub interface to Cell 2 506 to delete the radio link between Cell 2 506 and the UE 502.

Another reporting trigger may result when the Active Set is full, and a primary CPICH of a candidate cell outside the Active Set exceeds that of the weakest cell in the Active Set, such that it may be appropriate to replace the weakest cell in the Active Set with the candidate cell. Here, a reporting event called Event 1C may occur, causing a combined radio link addition and removal. Because the Event 1C is substantially a combination of the Event 1A and Event 1B, and is known to those skilled in the art, a detailed description is not included herein.

A high speed packet access (HSPA) air interface includes a series of enhancements to the 3G/W-CDMA air interface between the UE 310 and the UTRAN 302, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Rel. 5 HSDPA, at any instance a UE has one serving cell, that being the strongest cell in the Active Set as according to the UE measurements of $E_c/I_0$. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Figure 7:
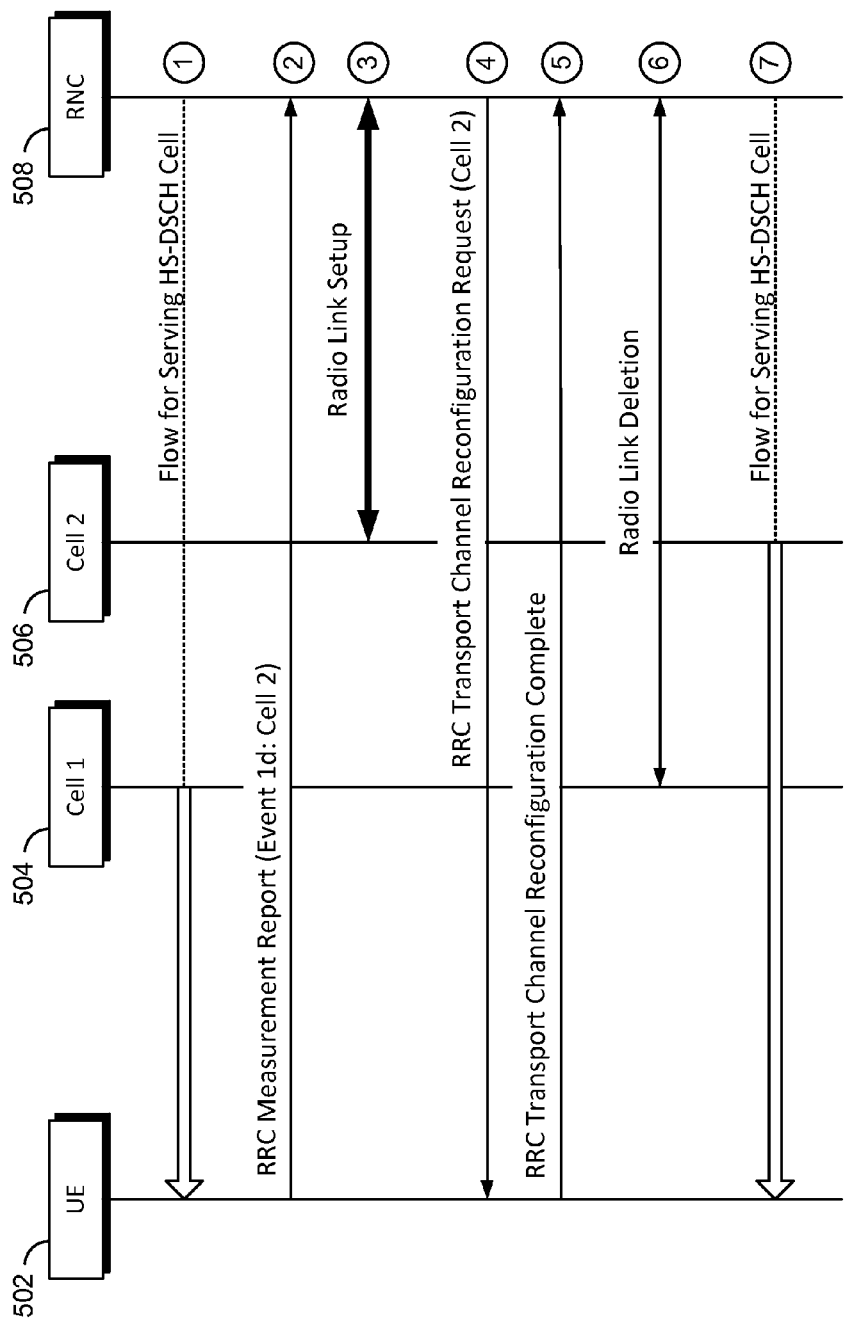
FIG. 7 is a call flow diagram illustrating an Event 1d mobility event.

That is, in addition to the reporting triggers dealing with Event 1a and Event 1b, described above, for HSDPA, another reporting trigger may result when a neighbor cell (which may or may not be within the Active Set) exceeds the quality of the serving HS-DSCH cell according to the UE measurements of $E_c/I_0$. In this case it may be appropriate to re-select the serving HS-DSCH cell. FIG. 7 is a simplified call flow diagram illustrating some of the signaling among nodes for Event 1d, which is the measurement event for the best serving HS-DSCH cell. In the illustrated example, at time (1) Cell 1 504 begins as the serving HS-DSCH cell. At time (2), the UE 502 may determine that Cell 2, 506, exceeds Cell 1, 504 in terms of its CPICH $E_c/I_0$. Thus, the UE 502 may transmit an RRC Measurement Report message including Event 1d and identifying Cell 2 506. In response, at time (3) the RNC 508 may transmit signaling to Cell 2 506 over the Iub interface utilizing NBAP signaling to set up a radio link with the UE 502. At time (4), the RNC 508 may send an RRC Transport Channel Reconfiguration Request to the UE 502 indicating a serving cell change, such that Cell 2, 506, will be the new serving HS-DSCH cell. The UE 502 may then respond at time (5) with an RRC Transport Channel Reconfiguration Complete message to the RNC 508. At time (6), the RNC may utilize NBAP signaling to delete the radio link setup at Cell 1 504. Thus, at time (7), HSDPA service can begin with the new serving HS-DSCH cell, i.e., Cell 2, 506.

Release 8 of the 3GPP standards introduced dual carrier HSDPA (DC-HSDPA), which enables a UE to aggregate dual adjacent 5-MHz downlink carriers transmitted by a Node B 308. The dual carrier approach provides higher downlink data rates and better efficiency at multicarrier sites. Generally, DC-HSDPA utilizes a primary carrier and a secondary carrier, where the primary carrier provides the downlink channels for data transmission and the uplink channels for data transmission, and the secondary carrier provides a second set of HS-PDSCHs and HS-SCCHs for downlink data transmission. Here, the primary carrier is generally the best serving HS-DSCH cell according to the UE measurements of $E_c/I_0$.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic. However, the DC-approach described herein above is not the only means for achieving downlink carrier aggregation.

According to some aspects of the disclosed approach, a multi-flow HSDPA network can provide for varied forms of carrier aggregation, e.g., where the respective downlink transmissions are transmitted from different Node B sites.

Figure 8:
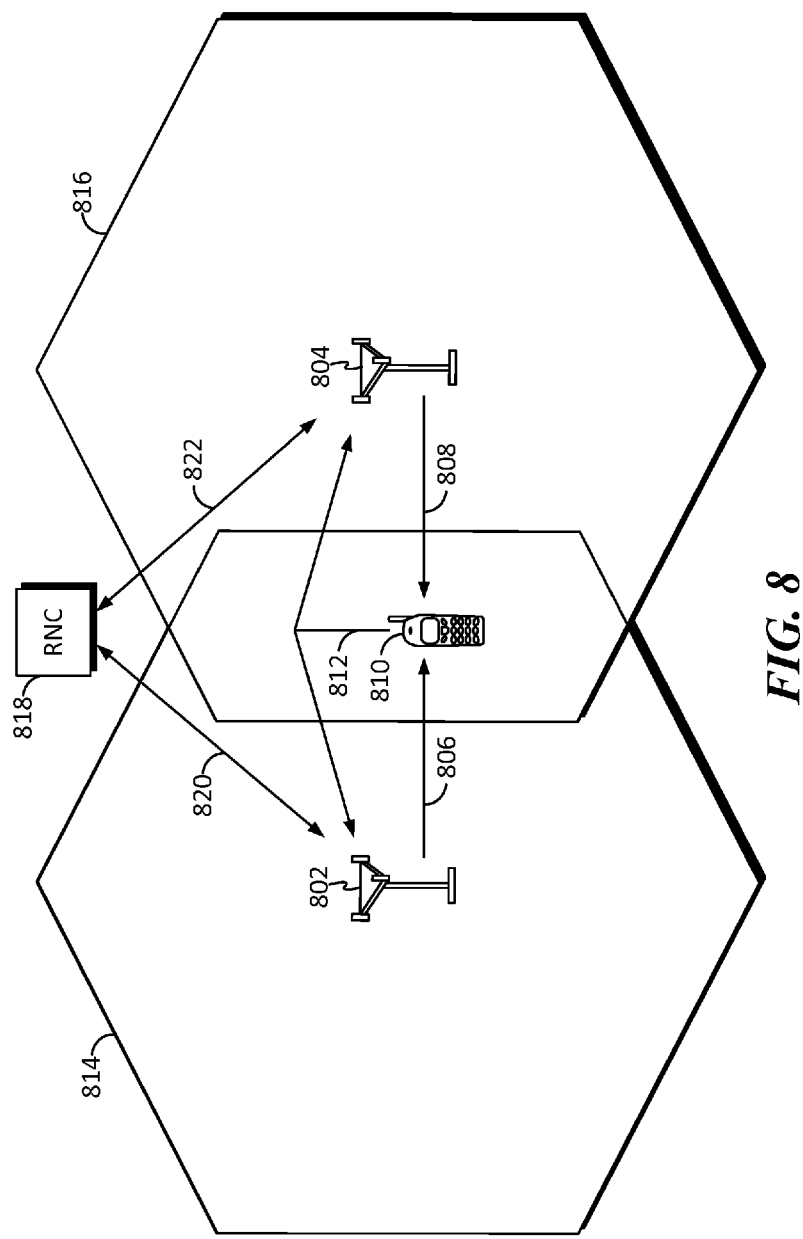
FIG. 8 is a conceptual diagram illustrating a dual-frequency dual-carrier access network.

FIG. 8 illustrates an exemplary access network for a multi-flow HSDPA system in accordance with some aspects of the disclosed approach wherein dual carriers can be aggregated. Such a system may be a single-frequency dual-cell (SF-DC) or a dual-frequency dual-cell (DF-DC) system. In FIG. 8, there may be a geographic overlap between two or more cells 814 and 816, such that a UE 810 may be served, at least for a certain period of time, by the multiple cells. Here, referring again to FIG. 3, the UE 810 is one example of a UE 310 that may be utilized in a UMTS system 300 in accordance with some aspects of the disclosed approach. That is, a wireless telecommunication system in accordance with the disclosed approach may provide HSDPA service from a plurality of cells, such that a UE 810 may perform aggregation. Here, the UE 810 may aggregate downlinks from a primary serving cell and at least one secondary serving cell. For example, a setup utilizing two or more cells may be referred to as multi-flow HSDPA (MF-HSDPA), coordinated multi-point HSDPA (CoMP HSDPA), or simply multipoint HSDPA. However, other terminology may freely be utilized. In this example, users at cell boundaries, as well as the overall system, may benefit from a high throughput. In various examples, the different cells may be provided by the same Node B or the different cells may be provided by disparate Node Bs.

In the scheme illustrated in FIG. 8, two Node Bs 802 and 804 each provide downlink channels 806 and 808, respectively, to the UE 810. Of course, as already described, in another example, both downlink channels 806 and 808 may be provided from different sectors of the same Node B. The UE 810 receives and aggregates the downlink channels and provides an uplink channel 812, which may be received by one or both Node Bs 802 and 804. The uplink channel 812 from the UE 810 may provide feedback information (e.g., corresponding to the downlink channel state) for the corresponding downlink channels 806 and 808.

A DC-HSDPA-capable UE has two receive chains, each of which may be used to receive HS data from a different carrier. In a multi-flow HSDPA-capable UE 810 according to an aspect of the disclosed approach, if the plural receive chains are made to receive HS data from different cells, at least some the benefits from carrier aggregation in a DC-HSDPDA network can be realized in a multi-flow HSDPA network.

Figure 9:
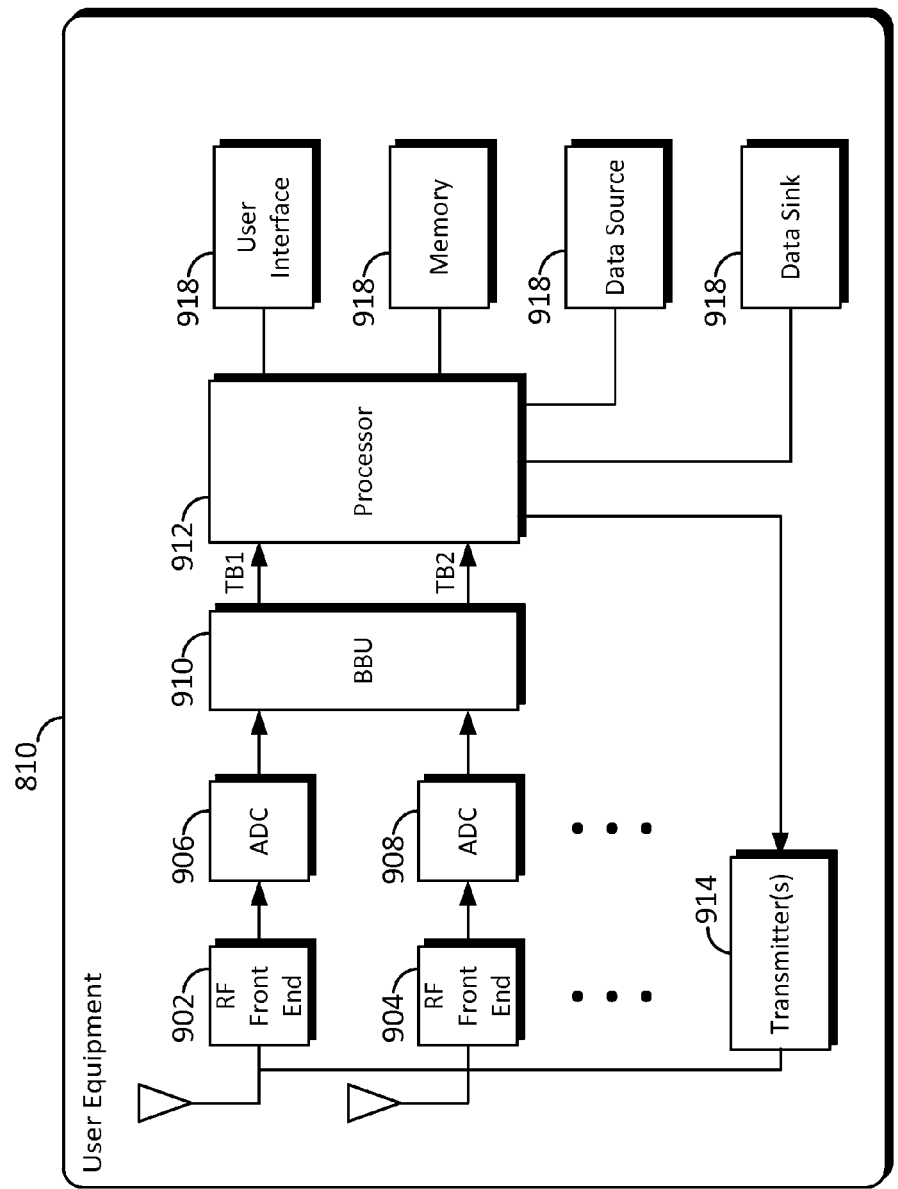
FIG. 9 is a block diagram illustrating a portion of a multi-carrier user equipment.

FIG. 9 is a simplified block diagram illustrating some of the components of an exemplary UE 810 for use in a multi-flow HSDPA network in accordance with some aspects of the disclosed approach. In the illustration, the UE 810 includes two receive antennas for receiving respective downlink signals, as in a SF-DC or DF-DC HSDPA network. However, within the scope of the disclosed approach, a UE 810 may include any number of antennas for receiving downlink signals in the same carrier frequency or in any suitable number of different carrier frequencies. Further, the illustrated UE 810 shows an example for a single-band network. In a multi-carrier network where the UE is configured to receive at least one carrier in each of two or more bands, the UE would further include blocks such as a diplexer, as is known to those of ordinary skill in the art.

Coupled to each of the antennas may be a respective RF front end 1302, 1404. The RF front end may include such functional blocks as RF down-conversion, low-pass filtering, etc. The RF front end then feeds into an analog to digital converter 1506 and 1608, which may transform the received downlink channels to the digital domain to be further processed by a base-band unit or BBU 1710. The BBU 1810 may include such functional blocks as carrier/antenna separation, a base-band detector, and a base-band decoder, configured to provide the received transport blocks to a processor 1912 to be further processed in accordance with the received information. In some examples, the processor 2012 may be the same as the processing system 114 illustrated in FIG. 1. The processor 2112 may additionally be coupled to one or more transmitters 2214, which may utilize one or more of the UE's antennas as managed by a suitable duplexer. The processor 2312 may additionally utilize a memory 2418 for storing information useful for the processing of the information.

As described above, in a DF-DC HSDPA network, the UE 810 may be served by two cells in different carrier frequencies, where the two cells may reside in the different Node B sites. In DF-DC operation, the serving cell on each carrier frequency may be independently determined. This is distinguished from conventional DC-HSDPA operation, wherein the UE 810 is always served by the same Node B in the adjacent carrier frequencies.

In a conventional network, all the mobility events for the UE 810 are generally based on the anchor carrier, or use the anchor carrier as the reference. However, in the DF-DC system, in accordance with an aspect of the disclosed approach, the UE 810 may report independent mobility events corresponding to the secondary carrier, in addition to reported mobility events corresponding to the anchor carrier. In this fashion, various aspects of the disclosed approach may provide improved mobility behaviour in the DF-DC system, especially under a scenario where the different cells have different coverage areas on each carrier.

Figure 10:
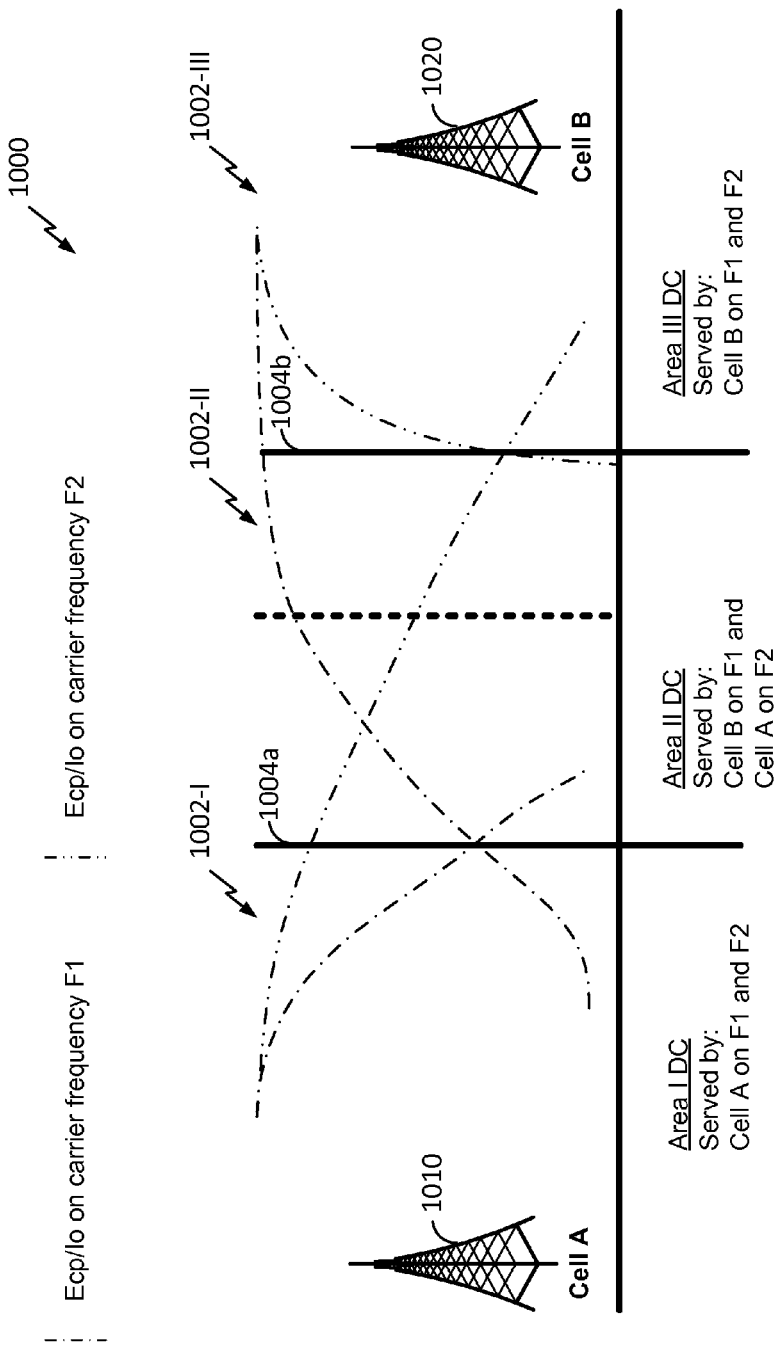
FIG. 10 is a conceptual diagram illustrating three zones of connectivity based on differing signal strength from different cells in a dual-frequency dual-cell access network.

FIG. 10 illustrates one example where coverage areas, such as an Area I 1002-I, an Area II, 1002-II, and an Area III 1002-III, may be different for respective cells, such as a cell A 1010 and a cell B 1020. In the illustrated example, the coverage difference may arise due to any of multiple practical reasons, for example:

If cell A 1010 is a normal macro cell having a relatively large transmit power, while cell B 1020 is a relatively small-power node, such as the case in a heterogeneous network deployment. In an aspect of the disclosed approach, the macro transmit power may be decreased on one carrier (e.g., F2) to expand the coverage of the small power node.

Cell A 1010 could have both F1 and F2 configured while cell B 1020 could have only one carrier configured.

Referring to FIG. 10, in one example, on the first carrier frequency F1 of cell B 1020 may have a much larger coverage area as compared to the second carrier frequency F2. Here, due to the difference in the coverage area in F1 and F2, in an aspect of the disclosed approach the whole area could be divided into three regions.

Area I 1002-I: This is the area where a UE such as the UE 810 may detect the stronger signal from cell A 1010 on both carrier frequencies, F1 and F2. UEs in Area I 1002-I may operate in a DC-HSDPA mode, and may be served by cell A 1010 on both F1 and F2.

Area II 1002-II: This is the area where the UE 810 detects the stronger signal from cell A 1010 on the second carrier frequency F2, while the UE 810 detects the stronger signal from cell B 1020 on the first carrier frequency, F1. UEs in Area II 1002-II may operate in a DF-DC HSDPA mode, and may be served by cell B 1020 on F1 and cell A 1010 on F2.

Area III 1002-III: This is the area where the UE 810 detects the stronger signal from cell B 1020 on both carrier frequencies, F1 and F2. UEs in Area III 1002-III may operate in a DC-HSDPA mode, and may be served by cell B 1020 on both F1 and F2.

As described above with relation to FIGS. 5-7, conventional mobility event triggering and reporting is based on the anchor carrier only. For example, referring again to FIG. 10, assume that UE 810 is a DF-DC HSDPA-capable UE having F2 as its anchor carrier and F1 as its secondary carrier moving from the left to right (i.e., moving away from cell A 1010 and towards cell B 1020). When the UE 810 crosses a boundary 1004a between Area I 1002-I and Area II 1002-II, the UE 810 may detect that cell B 1020 becomes stronger than cell A 1010 on the secondary carrier F1. However, utilizing the conventional mobility procedures, the UE 810 would not be capable of reporting that event to its serving cell in order to switch the serving cell on the secondary carrier F1 from cell B 1020 to cell A 1010.

Another consideration in a DF-DC system is the design of the uplink control channel, such as the HS-DPCCH, which carries the CQI and ACK/NACK information. In conventional DC-HSDPA operation, the UE only transmits its uplink signals on one uplink carrier frequency, generally corresponding to the downlink anchor carrier. That is, in DC-HSDPA, since the UE is served by the same Node B on both carriers, typically only the serving cell needs to decode the uplink HS-DPCCH, whose information is used for the packet scheduling on both downlink carriers.

On the other hand, in a DF-DC-HSDPA system according to various aspects of the disclosed approach, the UE 810 may be served by disparate Node Bs on different carrier frequencies. Here, it may be desirable for the uplink HS-DPCCH to be decoded at both Node Bs. Thus, the UE 810 may place both cells in its active set on the anchor carrier. However, when two cells are put into the UE's active set, they may implement power control on the UE at the same time. Here, the transmit power of the UE is determined by the cell in the UE's active set that has the better uplink from the UE. Consequently, the cell with the weaker uplink from the UE may have a problem decoding the HS-DPCCH.

This uplink received signal strength difference at two Node Bs, which may result in unreliable uplink control channel decoding by the weaker cell, may be referred to as an uplink imbalance. That is, a large uplink imbalance may cause unreliable HS-DPCCH decoding at the cell with the weaker uplink. Therefore, one aspect of the disclosed approach enables the UE 810 in a DF-DC HSDPA system to use either of the two carriers as the anchor carrier, where the RNC may select the carrier with the least amount of uplink imbalance as the anchor carrier.

Figure 11:
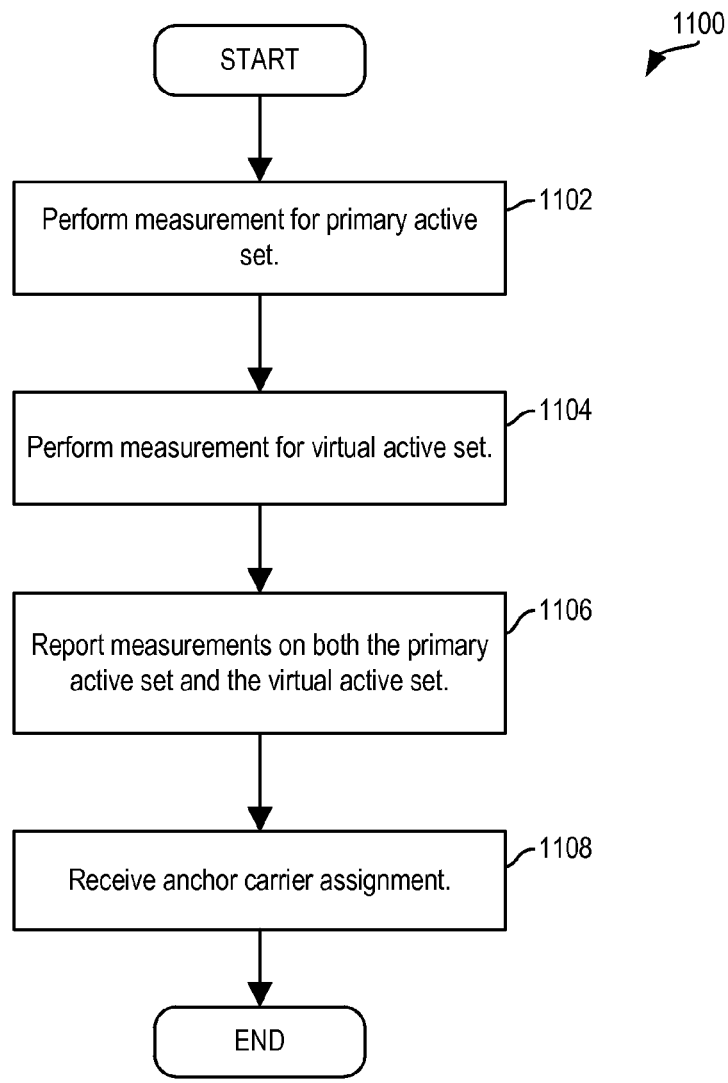
FIG. 11 is a flow diagram illustrating operation of a user equipment in a dual-frequency dual-cell access network configured in accordance with one aspect of the disclosed approach.
Figure 12:
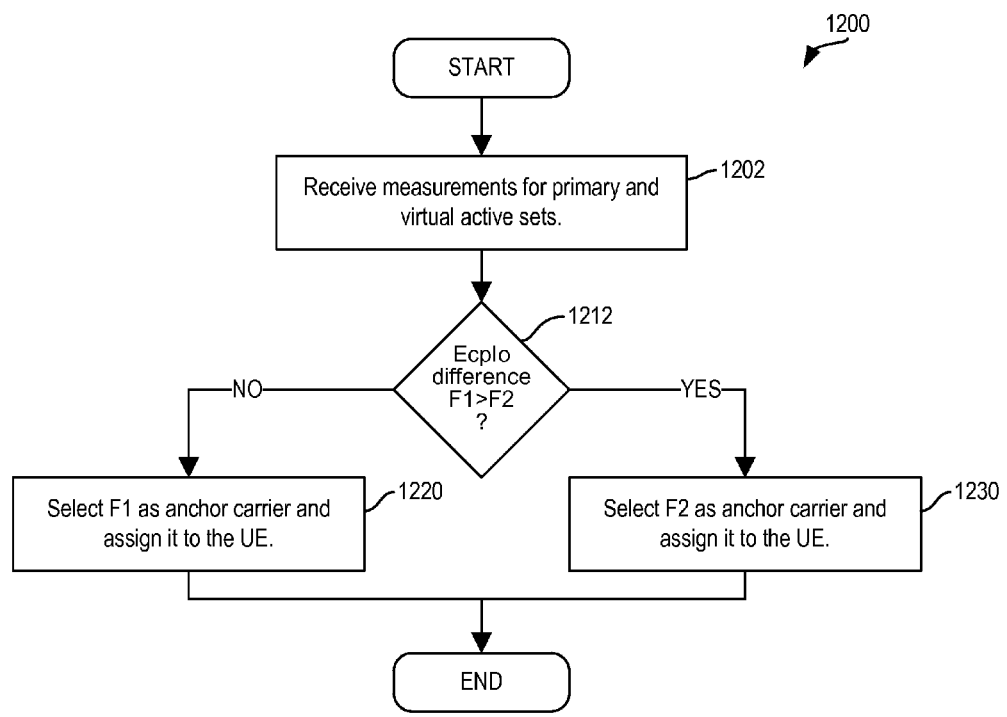
FIG. 12 is a flow diagram illustrating operation of a user equipment in a dual-frequency dual-cell access network configured in accordance with one aspect of the disclosed approach.

According to an aspect of the disclosed approach, the UE 810 may maintain a "virtual active set" corresponding to the secondary carrier, based on a "virtual mobility event" as described below. FIG. 11 illustrates a mobility event management process 1100 for a UE such as the UE 810 configured in accordance with various aspects of the disclosed approach. The UE 810 may perform measurements for the primary active set at 1102, and for the virtual active set at 1104. Then, the UE 810 may report virtual mobility events corresponding to the secondary carrier, independent of the conventional mobility events utilized for the primary carrier in conventional HSDPA, DC-HSDPA, etc. In one aspect of the disclosed approach, the virtual mobility events may include Virtual Event 1a; Virtual Event 1b, and Virtual Event 1d, where:

Virtual Event 1a: similar to the conventional Event 1a (see FIG. 5), this virtual mobility event may be used to add a cell to the virtual active set based on a measurement of the cell strength on the secondary carrier.

Virtual Event 1b: similar to the conventional Event 1b (see FIG. 6), this virtual mobility event may be used to remove a cell from the virtual active set based on a measurement of the cell strength on the secondary carrier.

Virtual Event 1d: similar to the conventional event 1d (see FIG. 7), this virtual mobility event may be used to change the best cell on the secondary carrier based on a measurement of the cell strength on the secondary carrier.

During the virtual mobility event reporting corresponding to any one or more of the virtual mobility events, the UE 810 may report all measurements on both the primary active set and the virtual active set to the RNC. Here, the RNC may use the report from the UE 810 to estimate the imbalance and may thereby choose the better anchor carrier. For example, referring once again to FIG. 11, at 1106 the UE 810 may report the measurement of cell A 1010 on both F1 and F2, namely, $EcpIo^1_A$ and $EcpIo^2_A$, respectively, as well as the measurement of cell B 1020 on both F1 and F2, namely, $EcpIo^1_B$ and $EcpIo^2_B$, respectively.

At 1212, based on the measurement report from the UE 810, the RNC may determine the anchor carrier for the UE 810 to reduce or minimize the imbalance. In one aspect of the disclosed approach, the RNC may assign the second frequency F2 as the anchor frequency to the UE 810 at 1230 if the difference between the measured EcpIo for the first frequency F1 for the first cell and the second cell is greater than the measured EcpIo for the second frequency F2 for the first cell and the second cell, as provided by the following expression:

$$|EcpIo^1_A - EcpIo^1_B| > |EcpIo^2_A - EcpIo^2_B|. \quad (1)$$

However, if the difference between the measured EcpIo for the first frequency F1 for the first cell and the second cell is less than or equal to the measured EcpIo for the second frequency F2 for the first cell and the second cell, as provided by the following $$|EcpIo^1{}_A - EcpIo^1{}_B| \leq |EcpIo^2{}_A - EcpIo^2{}_B|. \qquad (2)$$

then the RNC may assign the first frequency F1 as the anchor frequency to the UE 810 at 1220. That is, continuing with the example, the RNC may select the second frequency F2 as the anchor carrier if expression (1) is true, where the first cell is cell A 1010, and the second cell is cell B 1020. On the other hand, the RNC may select the first frequency F1 as the anchor carrier if expression (2) is true.

At 1108, the UE 810 may receive an anchor carrier assignment from the RNC.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of a list of" items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method performed by a user equipment comprising a first receive chain and a second receive chain, configured for wireless communication over a dual-frequency, dual-cell network comprising a primary carrier and a secondary carrier, the method comprising:
   receiving downlink communication from the primary carrier utilizing the first receive chain;
   receiving downlink communication from the secondary carrier utilizing the second receive chain;
   aggregating the downlink communications received from the primary carrier and from the secondary carrier;
   maintaining an active set corresponding to the primary carrier;
   maintaining a virtual active set corresponding to the secondary carrier; and
   transmitting a control signal comprising a virtual mobility event corresponding to a change in the virtual active set.

2. The method of claim 1, further comprising receiving an anchor carrier assignment based on the control signal.

3. The method of claim 2, wherein the anchor carrier comprises at least one of the primary carrier and the secondary carrier.

4. The method of claim 1, wherein the virtual mobility event comprises a virtual event 1a configured to add a cell to the virtual active set based on a measurement of a cell strength on the secondary carrier.

5. The method of claim 1, wherein the virtual mobility event comprises a virtual event 1b configured to remove a cell from the virtual active set based on a measurement of a cell strength on the secondary carrier.

6. The method of claim 1, wherein the virtual mobility event comprises a virtual event 1d configured to change a serving cell on the secondary carrier based on a measurement of a cell strength on the secondary carrier.

7. The method of claim 1, wherein the primary carrier and the secondary carrier are associated with different base stations.

8. A computer program product comprising:
   a non-transitory machine-readable storage medium comprising code for causing an apparatus to:
      receive downlink communication from a primary carrier utilizing a first receive chain of the apparatus;
      receive downlink communication from a secondary carrier utilizing a second receive chain of the apparatus;
      aggregate the downlink communications received from the primary carrier and the secondary carrier;
      maintain an active set corresponding to the primary carrier in a dual-frequency, dual-cell network;
      maintain a virtual active set corresponding to the secondary carrier in the dual-frequency, dual-cell network; and
      transmit a control signal comprising a virtual mobility event corresponding to a change in the virtual active set.

9. The computer program product of claim 8, wherein the machine-readable storage medium comprising code for receiving an anchor carrier assignment based on the control signal.

10. The computer program product of claim 9, wherein the anchor carrier comprises at least one of the primary carrier and the secondary carrier.

11. The computer program product of claim 8, wherein the virtual mobility event comprises a virtual event 1a configured to add a cell to the virtual active set based on a measurement of a cell strength on the secondary carrier.

12. The computer program product of claim 8, wherein the virtual mobility event comprises a virtual event 1b configured to remove a cell from the virtual active set based on a measurement of a cell strength on the secondary carrier.

13. The computer program product of claim 8, wherein the virtual mobility event comprises a virtual event 1d configured to change a serving cell on the secondary carrier based on a measurement of a cell strength on the secondary carrier.

* * * * *